US012574418B2

(12) United States Patent
Ponnuru et al.

(10) Patent No.: US 12,574,418 B2
(45) Date of Patent: Mar. 10, 2026

(54) CONFIDENTIAL RESOURCE TRUSTED DOMAIN MIGRATION STRATEGY

(71) Applicant: Dell Products L.P., Round Rock, TX (US)

(72) Inventors: Viswanath Ponnuru, Bangalore (IN); Vinay Sawal, Fremont, CA (US); Sumanth Vidyadhara, Bangalore (IN); Judith A. Furlong, Natick, MA (US); Krishnaprasad K, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 119 days.

(21) Appl. No.: 18/417,361

(22) Filed: Jan. 19, 2024

(65) Prior Publication Data

US 2025/0240324 A1 Jul. 24, 2025

(51) Int. Cl.
*H04L 29/06* (2006.01)
*H04L 9/40* (2022.01)

(52) U.S. Cl.
CPC .................................... *H04L 63/20* (2013.01)

(58) Field of Classification Search
CPC ....... H04L 63/20; H04L 63/10; H04L 63/105; H04L 63/1433; H04L 63/0263; H04L 63/12
See application file for complete search history.

(56) References Cited

U.S. PATENT DOCUMENTS

| | | | |
|---|---|---|---|
| 11,321,157 B2 * | 5/2022 | Hendrickson | ........... G06F 9/542 |
| 11,922,211 B2 * | 3/2024 | Li | ......................... G06F 9/5088 |
| 12,169,553 B2 * | 12/2024 | Bursell | ................. G06F 21/566 |

* cited by examiner

*Primary Examiner* — Longbit Chai
(74) *Attorney, Agent, or Firm* — Workman Nydegger

(57) ABSTRACT

One example method includes receiving, from a prospective tenant, a request to provision a tenant cluster of a cloud computing environment, creating, and/or accessing, a tenant-specific catalog that contains information identifying a tenant-specific configuration of trusted execution environment (TEE) hardware, provisioning the TEE hardware according to the information in the tenant-specific catalog, monitoring the TEE hardware for any TEE state changes, analyzing a detected TEE state change, and when the detected TEE state change indicates a specified risk, applying a TEE hardware maintenance state to the TEE hardware.

20 Claims, 4 Drawing Sheets

| Attribute | Description | Risk Rating |
|---|---|---|
| Owner EPOCHs | Changing the owner EPOCHs destroys the data in any existing enclaves | 10 |
| Enclave Signer Public key(s) Hashes | TEE Owner Public key changes | 9 |
| Memory encryption settings | Changes to the Memory encryption configurations | 8..6 |
| QoS | Enclave QoS configurations | 5..4 |
| APEX TEE Reserved | Reserved for future use | 3..1 |

CONFIDENTIAL RESOURCE TRUSTED DOMAIN MIGRATION STRATEGY

FIELD OF THE INVENTION

Embodiments of the present invention generally relate to implementation and management of cloud computing resources. More particularly, at least some embodiments of the invention relate to systems, hardware, software, computer-readable media, and methods, for migration of resources, such as trusted domains, within a cloud computing environment.

BACKGROUND

As enterprises migrate their data and computing needs to cloud infrastructure, they increasingly need a flexible, scalable, and secure marketplace for collaborative data creation, analysis, and exchange among enterprises. However, mutually distrusting data owners sharing their data is challenging for consumers. Confidential computing helps addresses such challenges by enabling the performance of data related processes and computations inside hardware-based Trusted Execution Environments (TEEs). However multiple strategies and TEE vendor proprietary technologies further increase the cloud service provider migration challenges.

For example, migration of a resource, such as a trusted domain configuration, to a target resource or cluster in the cloud, may be disrupted due security vulnerabilities or software bugs in a hypervisor, and/or a compromised hypervisor might change the guest TEE policy settings, thus compromising the security and operation of the resource. As another example, if the target resource or cluster is not prepared for the migration, there can be unexpected results for the migration attempt, such as failure to migrate the domain or other resource.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
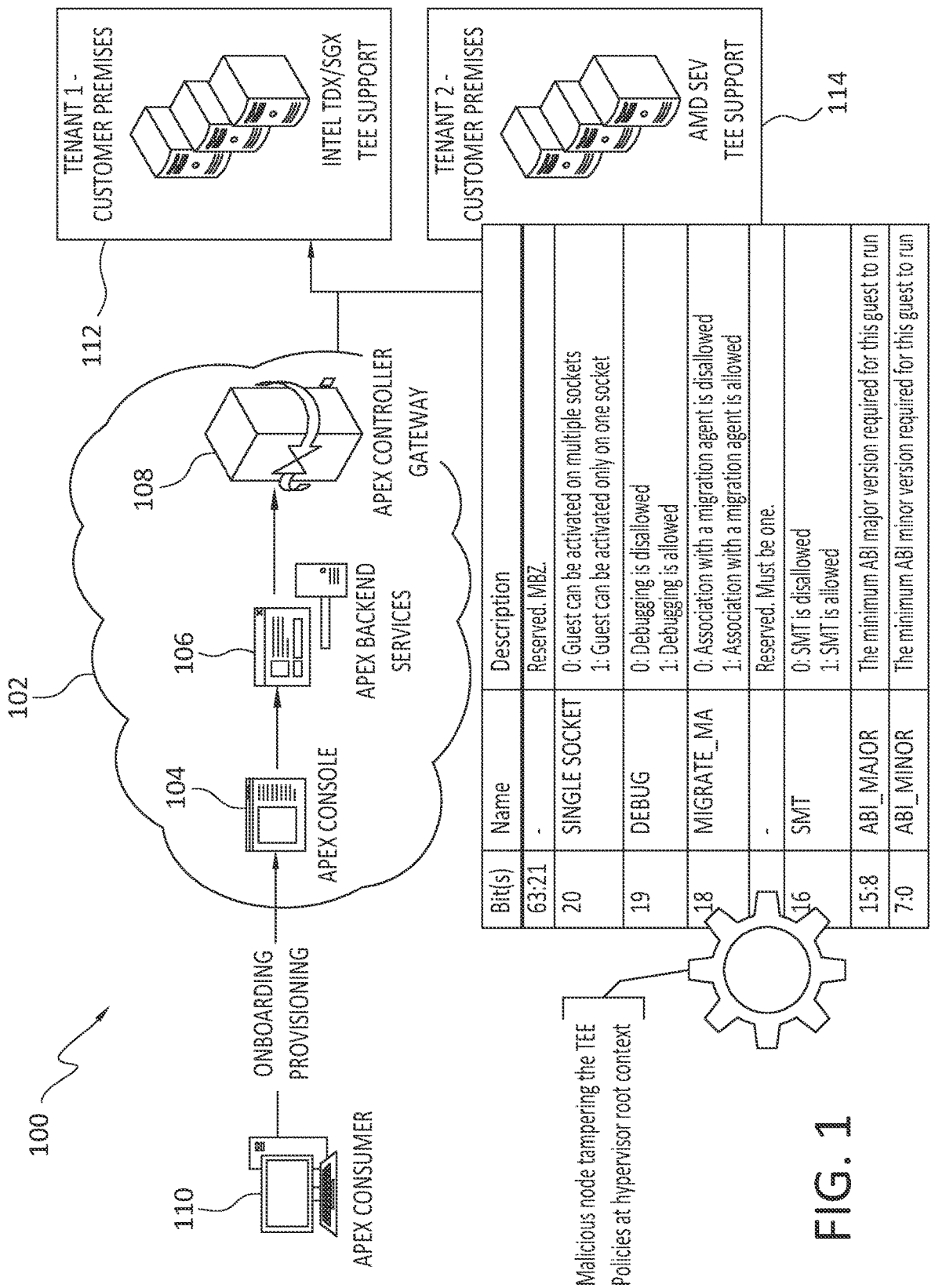
FIG. 1 discloses a hypothetical comparative example to illustrate a circumstance that may be addressed by an embodiment.

Embodiments of the present invention generally relate to implementation and management of cloud computing resources. More particularly, at least some embodiments of the invention relate to systems, hardware, software, computer-readable media, and methods, for migration of resources, such as trusted domains, within a cloud computing environment.

In general, an embodiment may comprise cloud managed confidential resource migration strategy, that is, migration of confidential resources such as execution environments, for efficient confidential resource migrations using tenant cluster health and resource configuration policies. One example embodiment comprises a method that may include various operations. In an embodiment, such operations may comprise: defining or modifying, possibly as part of a tenant onboarding process to a cloud environment, a tenant-specific catalog to include information about TEE (trusted execution environment) hardware associated with the tenant; using the information from the catalog to provision a bare metal machine (BMM) of the TEE; monitoring a configuration state of the TEE; analyzing changes to the configuration state; based on the analyzing, determining if there is a risk to the TEE hardware; and, when a risk is identified, implementing, based on a policy, a hardware maintenance task on the TEE hardware to mitigate or eliminate the risk.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that TEE policies and hardware configurations may be managed in a secure and confidential manner. An embodiment may enable updating of TEE hardware and/or software based on the outcome of a risk assessment. Various other advantages of one or more example embodiments will be apparent from this disclosure.

A. Context for an Example Embodiment

With particular attention to FIG. 1, one example of an operating environment for embodiments of the invention is denoted generally at 100. This hypothetical example illustrates some potential concerns to which one or more embodiments may be directed. More particularly, the example of FIG. 1 comprises a confidential compute platform hardware error detection scenario.

The example environment 100 may comprise a cloud computing environment 102, such as a Dell APEX compute environment of a Dell APEX private cloud environment, for example. Where the cloud computing environment 102 comprises a Dell APEX configuration, the cloud computing environment 102 may comprise a Dell APEX cloud console 104 that comprises a cloud management platform enabling users to access and control their cloud resources, APEX backend services 106 such as data backup services or computing services, and an APEX controller gateway 108 that may control access, by prospective tenants, to a tenant cluster in the cloud computing environment 102. As also shown in FIG. 1, the Dell APEX cloud console 104 may handle the onboarding of a customer, or tenant, such as an APEX consumer 110 for example.

As further indicated in the example of FIG. 1, the cloud computing environment 102 may host various tenants 112 and 114 that may be members of a tenant cluster. However, in this configuration, it is possible that whether by occurring by accident, or intentionally, a problem with the tenant 112 for example, and/or a problem elsewhere in the cloud computing environment 102, may compromise the hardware and operations of a legitimate tenant in the cluster, such as the tenant 114. In an embodiment, the tenants 112 and 114 may each comprise a respective TEE that may include both hardware and software. In the example of FIG. 1, the tenant 112 is configured to include, and support, an Intel TEE, and the tenant 114 is configured to include, and support, an AMD TEE. However, no particular TEE provider or configuration is required in any embodiment. Moreover, a TEE is not necessarily required in any embodiment, rather, other secure execution environments may alternatively be used.

Finally, as shown in FIG. 1, there is a possibility, in some environments at least, that malicious node tampering, or other activities, may compromise TEE policies that were used to set up and maintain the TEE environments in the tenants 112 and 114. Thus, an example embodiment comprises an approach to strengthen the trust of the tenants by providing a security mechanism and associated method that may enable monitoring and maintenance of TEE components so as to mitigate, or eliminate, security risks to a TEE environment.

B. Discussion of Aspects of an Example Embodiment

One example embodiment may comprise managed, such as Dell APEX cloud managed, confidential resource migration strategy for efficient confidential resource migrations using tenant cluster health and resource configuration policies. An example embodiment may comprise various useful features.

For example, an embodiment may comprise a confidential resource risk score analyzer, which may be managed by/in a Dell APEX platform, that helps to maintain planning for a trusted domain, such as a TEE, using confidential resource health and configuration metrics. As another example, and embodiment may comprise a confidential resource migration policy manager, which may be managed by/in a Dell APEX platform, that may provide unified policy mapper services for various vendor migration policies to enable seamless migrations of resources, such as a TEE, from one cloud to another of a multi-cloud environment.

Figure 2:
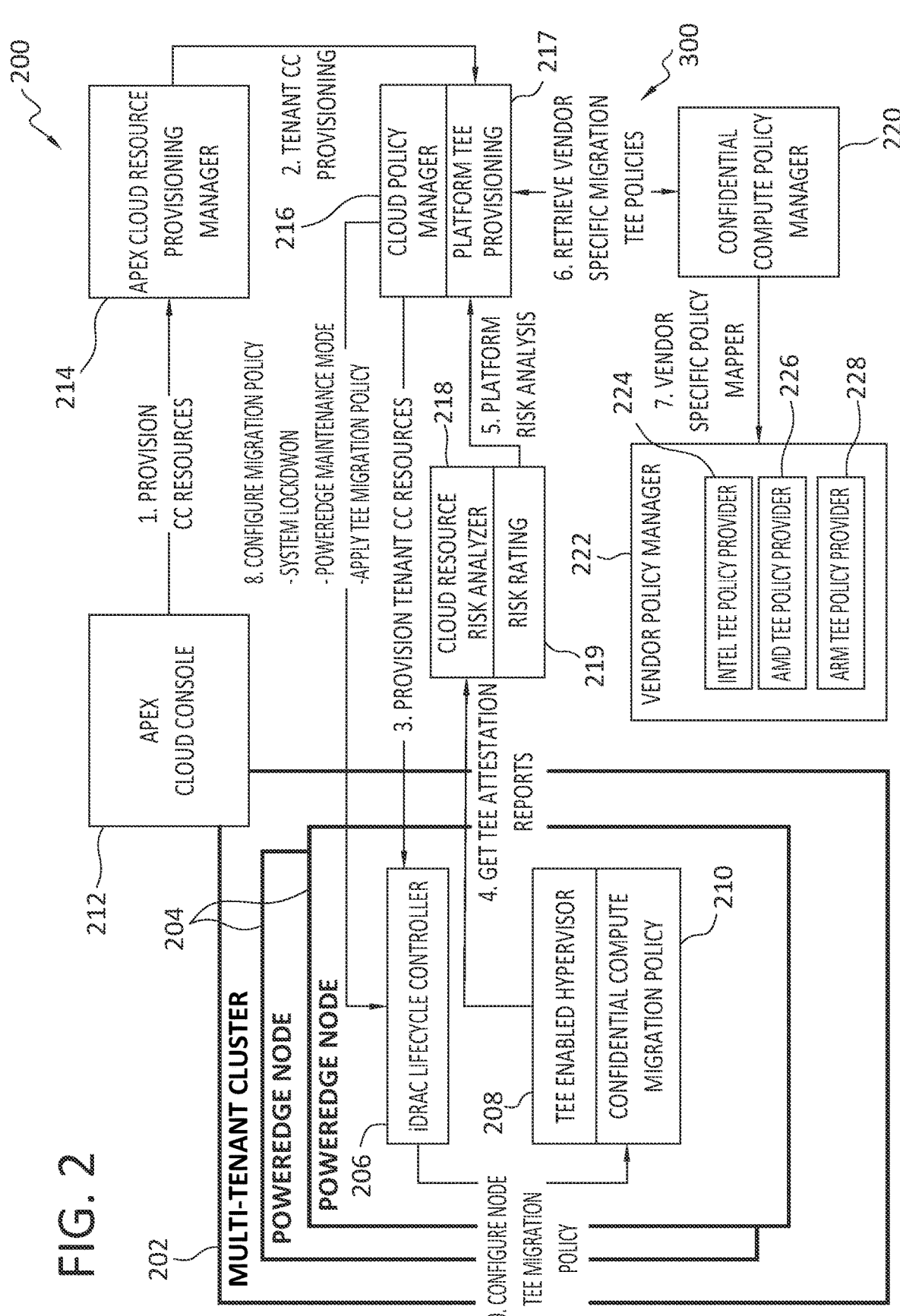
FIG. 2 discloses aspects of an architecture according to an embodiment.

With reference now to FIG. 2, an example architecture 200 and method 300 are disclosed that comprise various of the aspects discussed above. More particularly, FIG. 2 discloses a vendor-neutral migration strategy for confidential cloud computing. In the example of FIG. 2, an embodiment is implemented in connection with Dell APEX components and environments, although that is not required.

With reference first to the architecture 200, a tenant cluster 202 may be provided that includes various tenants 204, or 'nodes,' such as Dell PowerEdge nodes for example. Each of the tenants 204 may comprise various elements. In the illustrative, but non-limiting, case of a Dell PowerEdge node, the tenants 204 may each comprise: an iDRAC (integrated Dell remote access lifecycle controller) 206; and a TEE-enabled hypervisor 208. As discussed in further detail below, the TEE-enabled hypervisor 208, or simply 'hypervisor,' may implement and manage a confidential compute (CC) migration policy 210.

With continued reference to the example of FIG. 1, the example architecture 200 may further comprise a Dell APEX cloud console 212, or similar, along with a Dell APEX cloud resources provisioning manager 214, or similar. Further example components of the architecture 200 may comprise a cloud policy manager 216 that may perform platform TEE provisioning 217, a cloud resource risk analyzer 218 that may generate a risk rating 219, a CC policy manager 220, and a vendor policy manager 222. The vendor policy manager 222 may comprise respective TEE policy providers, which may comprise policies and related information, for each of a group of different vendors. Thus, the example vendor policy manager 222 comprises respective TEE policy providers 224, 226, and 228, for Intel, AMD, and ARM.

With attention now to the example method 300 disclosed in FIG. 2, the method 300 may begin when the cloud console 212, such as in response to a request from a consumer (see consumer 110 in FIG. 1), requests (1) the provisioning of a cloud resource by the cloud resource provisioning manager 214, which may then pass (2) a request to the cloud policy manager 216 to provision a TEE of a tenant. The cloud policy manager 216 may then provision (3) the tenant CC resources, which may include a TEE for that tenant. The provisioning information may be provided to the lifecycle controller 206.

In an embodiment, the TEE-enabled hypervisor 208 may then provide (4) TEE attestation reports to the cloud resource risk analyzer 218, which may perform a platform risk analysis to generate a risk rating 219. The risk rating, and other information, may then be provided (5) to the cloud policy manager 216, which may retrieve (6) vendor-specific migration TEE policies from the CC policy manager 220. The CC policy manager 220 may obtain (7) those policies from the vendor policy manager 222.

Using the vendor-specific migration TEE policies obtained at (6), the cloud policy manager 216 may then configure (8) a migration policy which may include, for example, locking down the system, moving the system into a maintenance mode, such as a Dell PowerEdge maintenance mode information for example, and then applying the TEE migration policy to the system. The migration policy information may be provided to the lifecycle controller 206 which may then configure (9) the node TEE migration policy which may be administered by the TEE-enabled hypervisor 208.

C. Example Methods

Figures 3, 4:
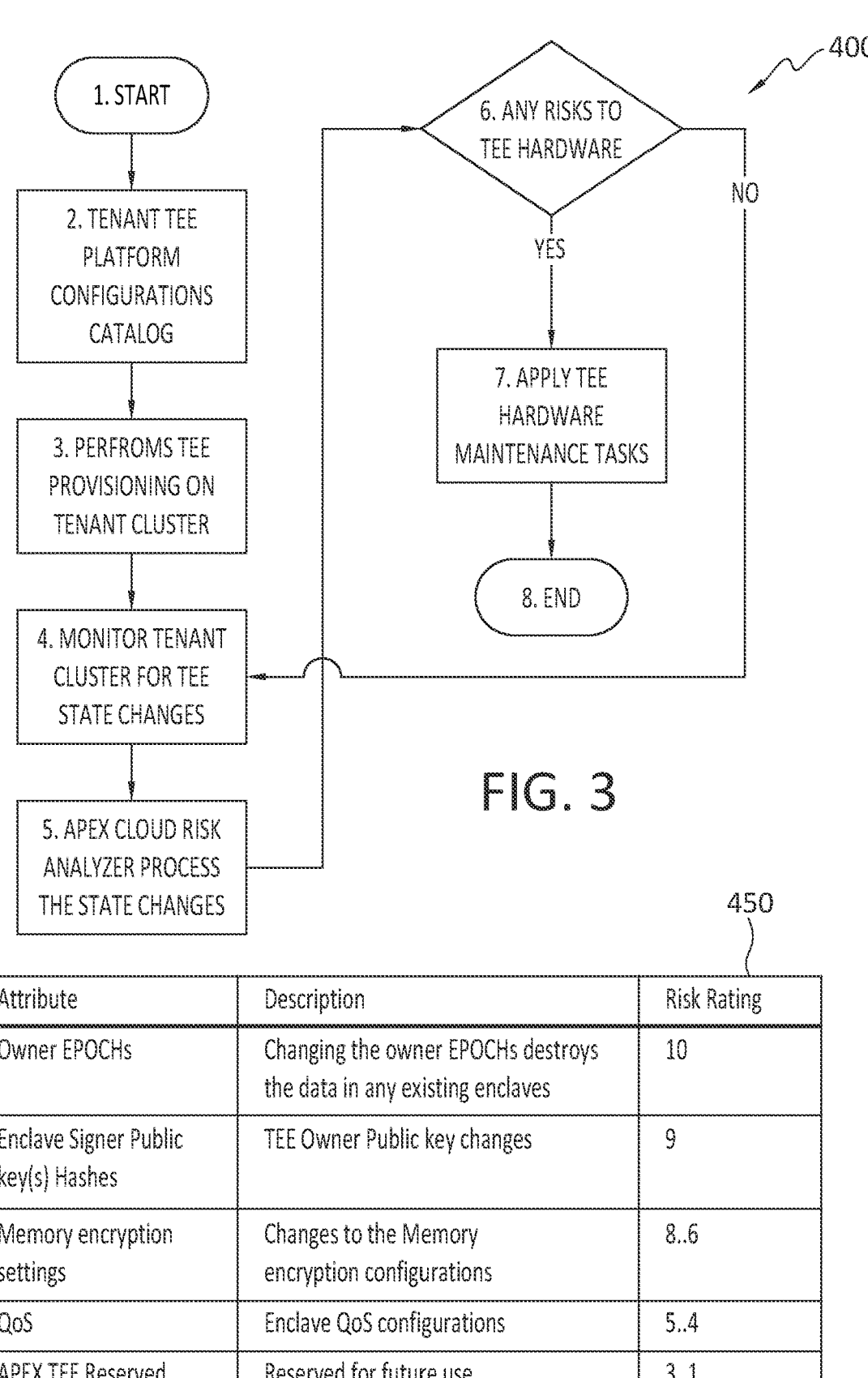
FIG. 3 discloses a method according to an embodiment.
FIG. 4 discloses an example risk table according to an embodiment.

It is noted with respect to the disclosed methods, including the example method of FIGS. 2 and 3, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 3, a further method 400 according to one example embodiment is disclosed. In general, the example method 400 may comprise a cloud resource trusted domain migration procedure. As used herein, a 'trusted domain migration procedure' may embrace, but is not limited to, the provisioning of a tenant specific TEE configuration in a tenant cluster of a cloud site, where this provisioning may be based on the TEE configuration of a tenant node of another cloud site.

One example of a trusted domain is a TEE in which various computing operations may be performed with respect to customer data. In an embodiment, part, or all, of the method 400 may be performed in, and by, a cloud computing environment. After initiation (1) of the method 400, which may be initiated in response to a tenant onboarding request such as may be received by a console (see console 104 in FIG. 1), a tenant-specific security catalog configuration file may be created/modified (2) that contains information such as customer, or tenant, specifications according to which the tenant TEE supported hardware may be configured, or provisioned. That is, the security catalog configuration file may contain TEE-supported, hardware per-tenant, specific configuration information that may be provided by the tenant.

The tenant-specific TEE configuration information may be used as a basis to provision (3) a bare metal system and the provisioned hardware may be tagged as a "security desired state." The bare metal system may be part of a tenant cluster in a cloud computing environment.

A cloud resource monitoring service, such as the Dell APEX Cloud resource monitoring service for example, may continuously monitor (4) any configuration state changes of the various TEE platform attributes. A configuration state change of a TEE, or component of a TEE, may occur, for example, on firmware updates, security vulnerabilities, or unattended configuration changes. A cloud risk analyzer, such as the Dell APEX cloud risk analyzer for example, may process any detected state changes and assign a respective risk rating to the detected state change. Some example attributes that may be monitored for state changes, and risk definitions associated with those attributes, are disclosed in the table 450 shown in FIG. 4. The table 450 also indicates relative risk ratings that may be assigned to a particular type of state change.

After any state changes have been detected and categorized, such as with the attributes in the table 450, a check (6) may be performed to determine whether the state change presents a risk to a TEE component, such as TEE hardware for example. That is, the check (6) may comprise checking to see if there any specific risks to the cluster TEE hardware. If no risk is determined (6) to exist, the method 400 may return to (4). On the other hand, if there is a risk, as shown in the table 450, identified to the tenant cluster, such as a Dell APEX tenant cluster, the cloud policy manger may apply (7), possibly automatically without human intervention, one or more system maintenance states to the TEE hardware based on the risks to prevent failures or other problems. Such system maintenance states may comprise, for example, migration, or set system lockdown. The nature of the system maintenance state may correspond to the nature of the risk presented. Thus, a risk of hardware corruption or failure for example, may result in application of a system lockdown maintenance state. By locking down the system, the risk may be mitigated, or avoided.

In an embodiment, a notification may be transmitted, as part of (7), to a system administrator. The notification may include information about the risk presented, the possible impact of the risk, and hardware/software that could be affected. Thus, the notification may enable the administrator to take actions, which may be in addition to application of a system maintenance state, to avoid the identified potential problems. After the maintenance state(s) have been applied (7) to the TEE hardware, the method 400 may terminate (8).

D. Further Example Embodiments

Following are some further example embodiments of the invention. These are presented only by way of example and are not intended to limit the scope of the invention in any way.

Embodiment 1. A method, comprising: receiving, from a prospective tenant, a request to provision a tenant cluster of a cloud computing environment; creating, and/or accessing, a tenant-specific catalog that contains information identifying a tenant-specific configuration of trusted execution environment (TEE) hardware; provisioning the TEE hardware according to the information in the tenant-specific catalog; monitoring the TEE hardware for any TEE state changes; analyzing a detected TEE state change; and when the detected TEE state change indicates a specified risk, applying a TEE hardware maintenance state to the TEE hardware.

Embodiment 2. The method as recited in any preceding embodiment, wherein, prior to the provisioning, the TEE hardware comprises bare metal hardware.

Embodiment 3. The method as recited in any preceding embodiment, wherein the provisioning is based in part on a configuration of TEE hardware in another cloud computing environment.

Embodiment 4. The method as recited in any preceding embodiment, wherein the specified risk is determined by a confidential resource risk score analyzer.

Embodiment 5. The method as recited in any preceding embodiment, wherein the provisioning of the TEE hardware comprises an element of a trusted domain migration strategy.

Embodiment 6. The method as recited in embodiment 5, wherein a vendor policy manager provides a unified policy mapper service for vendor migration policies to enable migration of a TEE configuration from one cloud to another cloud, in a multi-cloud environment.

Embodiment 7. The method as recited in any preceding embodiment, wherein a TEE enabled hypervisor is used to configure a TEE migration policy used in the provisioning of the TEE hardware.

Embodiment 8. The method as recited in any preceding embodiment, wherein the hardware maintenance state comprises any one or more of: a system lockdown; a maintenance mode; or, application of a TEE migration policy.

Embodiment 9. The method as recited in any preceding embodiment, wherein each node of the tenant cluster has its own respective TEE migration policy.

Embodiment 10. The method as recited in any preceding embodiment, wherein the applying of the TEE hardware maintenance state reduces the risk to a level lower than if the TEE hardware maintenance state had not been applied.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
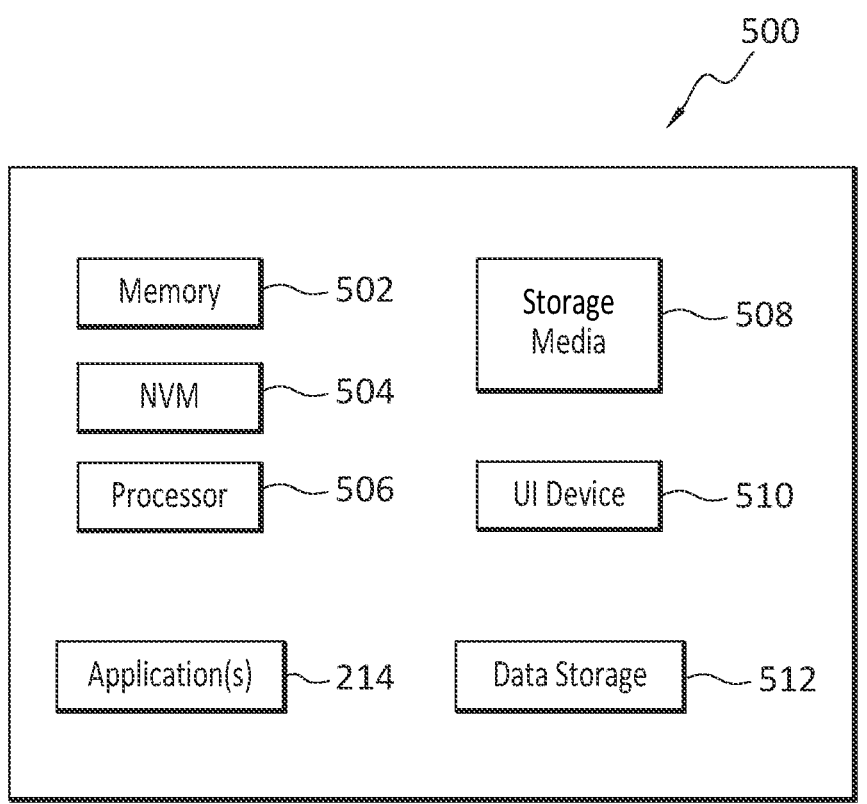
FIG. 5 discloses a computing entity configured and operable to perform any of the disclosed methods, processes, and operations.

With reference briefly now to FIG. 5, any one or more of the entities disclosed, or implied, by FIGS. 1-4, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

receiving, from a prospective tenant, a request to provision a tenant cluster of a cloud computing environment;

creating, and/or accessing, a tenant-specific catalog that contains information identifying a tenant-specific configuration of trusted execution environment (TEE) hardware;

retrieving vendor-specific migration TEE policies from one or more vendors;

implementing a vendor-neutral migration policy based on the vendor-specific migration TEE policies;

provisioning the TEE hardware according to the information in the tenant-specific catalog and the vendor-neutral migration policy;

monitoring the TEE hardware for any TEE state changes;

analyzing a detected TEE state change; and when the detected TEE state change indicates a specified risk, applying a TEE hardware maintenance state to the TEE hardware.

2. The method as recited in claim 1, wherein, prior to provisioning, the TEE hardware comprises bare metal hardware.

3. The method as recited in claim 1, wherein the provisioning is based in part on a configuration of TEE hardware in another cloud computing environment.

4. The method as recited in claim 1, wherein the specified risk is determined by a confidential resource risk score analyzer.

5. The method as recited in claim 1, wherein the provisioning of the TEE hardware comprises an element of a trusted domain migration strategy.

6. The method as recited in claim 5, wherein a vendor policy manager provides a unified policy mapper service for vendor migration policies to enable migration of a TEE configuration from one cloud to another cloud, in a multi-cloud environment.

7. The method as recited in claim 1, wherein a TEE enabled hypervisor is used to configure a TEE migration policy used in the provisioning of the TEE hardware.

8. The method as recited in claim 1, wherein the hardware maintenance state comprises any one or more of: a system lockdown; a maintenance mode; or, application of a TEE migration policy.

9. The method as recited in claim 1, wherein each node of the tenant cluster has its own respective TEE migration policy.

10. The method as recited in claim 1, wherein the applying of the TEE hardware maintenance state reduces the specified risk if the TEE hardware maintenance state had not been applied.

11. A non-transitory storage medium having stored therein instructions that are executable by one or more hardware processors to perform operations comprising:

receiving, from a prospective tenant, a request to provision a tenant cluster of a cloud computing environment;

creating, and/or accessing, a tenant-specific catalog that contains information identifying a tenant-specific configuration of trusted execution environment (TEE) hardware;

retrieving vendor-specific migration TEE policies from one or more vendors;

implementing a vendor-neutral migration policy based on the vendor-specific migration TEE policies;

provisioning the TEE hardware according to the information in the tenant-specific catalog and the vendor-neutral migration policy;

monitoring the TEE hardware for any TEE state changes;

analyzing a detected TEE state change; and when the detected TEE state change indicates a specified risk, applying a TEE hardware maintenance state to the TEE hardware.

12. The non-transitory storage medium as recited in claim 11, wherein, prior to the provisioning, the TEE hardware comprises bare metal hardware.

13. The non-transitory storage medium as recited in claim 11, wherein the provisioning is based in part on a configuration of TEE hardware in another cloud computing environment.

14. The non-transitory storage medium as recited in claim 11, wherein the specified risk is determined by a confidential resource risk score analyzer.

15. The non-transitory storage medium as recited in claim 11, wherein the provisioning of the TEE hardware comprises an element of a trusted domain migration strategy.

16. The non-transitory storage medium as recited in claim 15, wherein a vendor policy manager provides a unified policy mapper service for vendor migration policies to enable migration of a TEE configuration from one cloud to another cloud, in a multi-cloud environment.

17. The non-transitory storage medium as recited in claim 11, wherein a TEE enabled hypervisor is used to configure a TEE migration policy used in the provisioning of the TEE hardware.

18. The non-transitory storage medium as recited in claim 11, wherein the hardware maintenance state comprises any one or more of: a system lockdown; a maintenance mode; or, application of a TEE migration policy.

19. The non-transitory storage medium as recited in claim 11, wherein each node of the tenant cluster has its own respective TEE migration policy.

20. The non-transitory storage medium as recited in claim 11, wherein the applying of the TEE hardware maintenance state reduces the specified risk if the TEE hardware maintenance state had not been applied.

* * * * *